MICHAEL KING RUSSELL
ERIC RAYMOND KENDALL — Inventors

Hall, Pollock + Vande Sande
— Attorneys

United States Patent Office 3,369,396
Patented Feb. 20, 1968

3,369,396
AIRCRAFT OVERSHOOT DIRECTOR
Michael King Russell, Leckhampton, Cheltenham, and Eric Raymond Kendall, Woodmancote, Cheltenham, England, assignors to Smiths Industries Limited, London, England, a British company
Filed Jan. 18, 1966, Ser. No. 521,372
Claims priority, application Great Britain, Jan. 20, 1965, 2,464/65
18 Claims. (Cl. 73—178)

ABSTRACT OF THE DISCLOSURE

An aircraft overshoot director computes a demand for pitching movement of the aircraft as the difference from a programmed constant value of the sum of two terms, one term being proportional to the aircraft incidence-angle and the other to the aircraft pitch-angle. The difference is either displayed directly, or is compared with aircraft pitch-rate to provide a notional pitch-rate demand.

---

Figure 1:
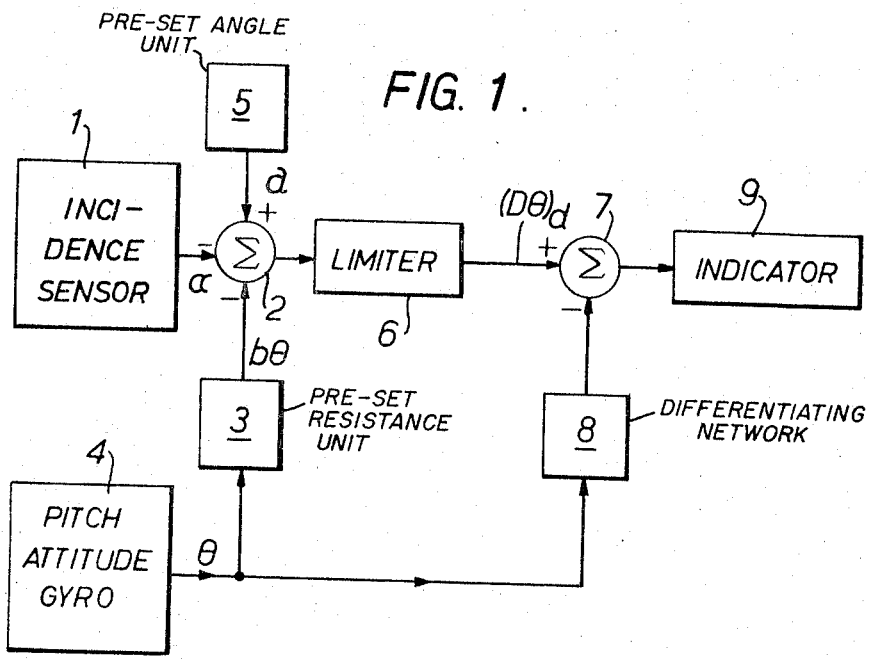

The present invention relates to aircraft instruments.

It is becoming increasingly necessary to provide fast modern aircraft with instruments that are designed specifically to deal with certain critical flight maneuvers and present to the pilot information regarding the action he must take. One such critical maneuver is that of a missed approach or overshoot, that is to say, the maneuver which is initiated when an approach to a landing is abandoned. During a missed approach the aircraft has to be handled with precision in order that the flight path shall be well above obstacles on the ground and yet not at any stage so steep that the aircraft fails to gain sufficient speed for safe flight.

It is an object of the present invention to provide an aircraft instrument that may be used especially to assist a pilot in achieving an acceptable flight path during a missed approach.

According to one aspect of the present invention, an aircraft instrument comprises first means for providing a signal dependent upon pitch attitude of the aircraft, second means for providing a signal dependent upon incidence of the aircraft, and third means for providing in accordance with the signals provided by the first and second means a representation of the difference from a predetermined value of the value of a predetermined function that is dependent upon both the pitch attitude and the incidence of the aircraft.

The function dependent upon pitch attitude and incidence may simply be the algebraic sum of two terms that are respectively dependent upon pitch attitude and incidence. The said function may simply be:

$$(\alpha + b\theta)$$

where $\alpha$ is the angle of incidence, otherwise known as angle of attack, of the aircraft,
$\theta$ is the pitch angle of the aircraft, and
$b$ is a constant having, for example, a value of $0 \cdot 6$.

The present invention is based on the discovery that, over a wide range of performance conditions of the aircraft concerned, a satisfactory steady climb-out in a missed approach can be achieved if the aircraft is controlled in pitch to bring the value of this function to equal the value of a predetermined contsant $a$. The choice of value for the constant $a$, and also the choice of value for the constant $b$, depends upon factors such as the type of aircraft used, the range of performance conditions that is to be covered, and the climb-out requirements within the range.

The representation provided as aforesaid by the instrument may be a visual representation or alternatively a signal (for example, an electric signal) representing the difference between the value of the function and the predetermined value. In normal circumstances it will be arranged that this predetermined value is the value of the function appropriate to the achievement of a satisfactory flight path, since all that is then necesary during the maneuver is to control the aircraft in pitch to reduce said difference to zero and maintain it there.

Where the representation is provided in the form of a signal, this in its turn may be used in the provision of some other representation dependent upon the difference between the value of said function and predetermined value. For example, where it is desired to provide the pilot with direction as to the manner in which he is to reduce the difference to zero, the signal may be taken as a demand for rate of change of pitch attitude, and then used in the provision of a representation of the difference between the demanded and actual rates of change of pitch attitude. Alternatively, however, in the event that fully- or semi-automatic aircraft control facilities are provided, the signal may be used more directly in the control of the aircraft.

According to another aspect of the present invention, air aircraft instrument comprises first means for providing a signal in accordance with pitch attitude of the aircraft, second means for providing a signal in accordance with incidence of the aircraft, third means for providing a signal in accordance with rate of change of pitch attitude of the aircraft, and fourth means which is arranged to be responsive to the signals provided by the first, second and third means to provide a representation of difference between said rate of change of pitch attitude and a demanded rate of change of pitch attitude, said demanded rate of change of pitch attitude having a value which is in accordance with the difference from a predetermined value of the value of a predetermined function that is dependent upon both the pitch attitude and the incidence of the aircraft.

Although specific reference has been made above to use of the aircraft instrument of the present invention for the missed approach, it is also applicable at least for climb-out of a take-off maneuver.

Figure 4:
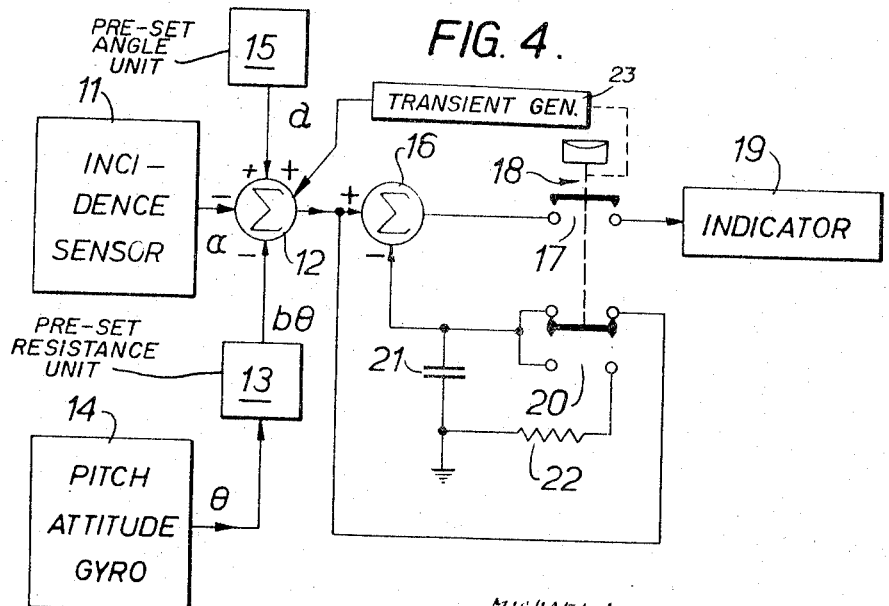
Figure 2:
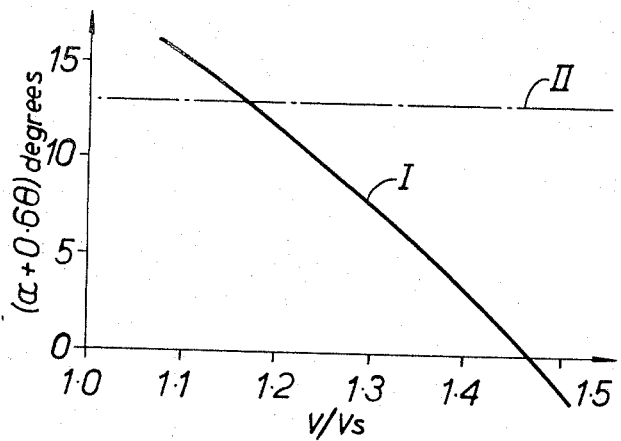
Figure 3:
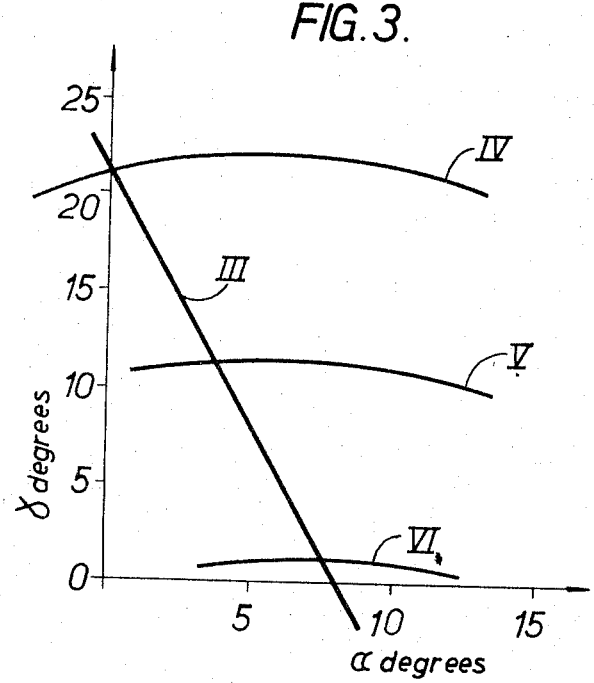

Two aircraft instruments in accordance with the present invention will now be described, by way of example, with reference to the accompanying drawings, in which:

FIGURE 1 is a schematic representation of a first of the two aircraft instruments;

FIGURES 2 and 3 serve to illustrate the operation of the instrument of FIGURE 1 during a missed approach; and FIGURE 4 is a schematic representation of the second aircraft instrument.

Referring to FIGURE 1, an incidence sensor 1, which may for example include pressure-sensing orifices or angularly-deflectable vanes mounted externally of the aircraft, is responsive to the angle of incidence of the aircraft and supplies to a summing amplifier 2 a signal representative of the sensed angle of incidence $\alpha$. The summing amplifier 2 receives two further signals, one of these being supplied to the amplifier 2 via a pre-set resistance unit 3 from a pitch attitude gyro unit 4. The pitch attitude gyro unit 4, which for example may be the conventional vertical gyro unit of the aircraft, supplies to the unit 3 a signal representative of the pitch angle $\theta$ of the aircraft, and the signal which is as a result passed by the unit 3 to the amplifier 2 is representative of $b\theta$, where $b$ is a constant. The constant $b$ has a value, for example of $0 \cdot 5$ or $0 \cdot 6$, that is dependent upon the resistance-setting of the unit 3.

The third signal supplied to the summing amplifier 2 is supplied from a pre-set unit 5 and is nominally representative of a predetermined constant angle $a$. The predetermined constant angle $a$ has a value, for example of eighteen or thirteen degrees, that is dependent upon the setting of the unit 5. The unit 5 may be provided, for example, by a pre-set potentiometer arrangement, and it may be arranged that its setting is varied in accordance with the setting of the flaps of the aircraft.

The three signals supplied to the summing amplifier 2 are combined therein to provide an output signal that is representative of the extent to which the value of the function:

$$(\alpha + b\theta) \qquad (1)$$

differs from the constant angle $a$. This output signal of the amplifier 2 is given by:

$$a - (\alpha + b\theta) \qquad (2)$$

and is supplied via a limiter unit 6 to a further summing amplifier 7. Although this signal is representative of angular difference and not rate of change of angle, it is taken as representative of a demand, $(D\theta)_d$, for rate of change of pitch attitude (D being the differential operator representative of differentiation with respect to time). The demanded pitch rate $(D\theta)_d$, as so represented is limited under the action of the limiter unit 6 to a maximum value which in terms of demanded pitch-rate corresponds for example, to about 2·5 degrees per second.

In addition to the signal nominally representative of the demanded pitch rate $(D\theta)_d$, the summing amplifier 7 receives a signal which is representative of the actual pitch rate $D\theta$ of the aircraft. This latter signal is derived via a differentiating network 8 from the signal representative of pitch angle $\theta$ supplied by the pitch attitude gyro unit 4. the network 8 has a transfer function:

$$\tau_1 D/(1+\tau_2 D)$$

where $\tau_1$ and $\tau_2$, which are both constants having the dimension of time, have values for example of three seconds and one second respectively.

The two signals supplied to the summing amplifier 7 are combined therein to provide an output signal representative of:

$$(D\theta)_d - [\tau_1 D/(1+\tau_2 D)]\theta \qquad (3)$$

that is to say, effectively representative in magnitude and sense of any difference between the actual pitch rate and that demanded in accordance with function (2). This output signal is passed from the amplifier 7 to an indicator 9 that provides an indication of the magnitude and sense of the signal. Such indication thereby provides a visual representation of the extent to which the actual pitch rate differs from that demanded, the instrument as a direct consequence of this providing directions for control of the aircraft in pitch required to maintain the value of function (3) zero. When these directions are followed by the pilot throughout a missed approach a satisfactory flight path for the maneuver is achieved, and this applies over a wide range of performance conditions of the aircraft.

When a missed approach is initiated, that is to say when the pilot of an aircraft on approach to a landing decides and first takes action to abandon the landing, the flight path of the aircraft is normally inclined downwards at some small angle, for example, three degrees to ground. The value of function (2) in these circumstances is normally positive being larger for a fast, steep approach ($\alpha$ and $\theta$ small) than for a slow, flat approach ($\alpha$ and $\theta$ large). Positive values of function (2) demand nose-up pitching movement of the aircraft and so the movement demanded in this respect is correctly related in both magnitude and sense to the conditions existing at the initiation of the overshoot maneuver. In extreme cases where the airspeed V of the aircraft during approach has been allowed to decrease towards the stall value $V_s$, the value of function (2) may be negative, and in this case the initial demand until speed is gained is appropriately for a nose-down pitching movement required to avoid stall.

FIGURE 2 shows for the approach to a landing of one particular two-engined turbo-jet aircraft, the variation in the value of function (1) through a range of approach speeds. This variation is represented by curve I, the value of constant $b$ being taken as 0·6 and the approach speeds each being expressed as a ratio of the relevant speed V to the stall speed $V_s$. In FIGURE 2 there is also represented. by the broken straight line II and for the case in which the value of constant $a$ is thirteen degrees, the value of function (1) for which function (2) is zero. The difference in ordinate between curve I and line II at any particular speed is representative in magnitude and sense of the initial demand for pitching movement provided by the instrument. The value of the demand is large and in the nose-up sense for an approach speed of $1·5 V_s$, and decreases with decrease in approach speed down to the speed, $1·16 V_s$, at which it becomes zero. At approach speeds less than $1·16 V_s$ the demand is in the nose-down sense, but large nose-down values do not arise unless the speed is very much less than this.

The indication provided by the indicator 9 directs the pilot to achieve an appropriate climb-gradient $\gamma$ for the climb-out phase following the flare-up pitching movement of the missed approach. By following the direction of indicator 9 to maintain function (3) zero, function (2) is also maintained zero. Any departure from the appropriate climb-gradient $\gamma$ results in change from zero of function (2), and the consequent change from zero of function (3) indicated by the indicator 9 directs the pilot to produce pitching movement of the aircraft in the appropriate sense and at an appropriate rate to restore function (2) to zero and the aircraft to the appropriate flight path. The magnitude of the pitch-rate called for subsides to zero as the air craft is brought progressively to this flight path.

The appropriate gradient $\gamma$ of the climb-out flight path varies from one flight to another and depends mainly on the weight of the aircraft and the thrust available. For the type of turbo-jet aircraft referred to above in connection with FIGURE 2, the range of achievable climb-gradient $\gamma$ varies from about twenty degrees for high-performance conditions (low weight with both engines operative) down to just over one degree for low-performance conditions (high weight with only one engine operative and in circumstances of high ambient temperature over an airport situated at a high altitude). The climb speed also has an effect on the gradient $\gamma$ but, compared with the effects of weight and thrust, this is not normally significant over the likely range of speeds used in practice.

When function (2) is maintained at zero for the climb-out phase the value of incidence (and thereby of speed) achieved in accordance with the climb capability of the aircraft is well-suited to the performance conditions existing, and this applies throughout the range of performance conditions of the aircraft. If the climb capability is low, the incidence is high and the speed low, whereas if the climb capability is high, the incidence is low and the speed high. This interplay of performance capability and climb speed closely resembles the scheduled procedures laid down for civil aircraft, and is reproduced simply by controlling the aircraft in pitch to maintain function (2) zero. FIGURE 3 illustrates this.

In FIGURE 3, there is shown, by line III, the variation of climb-gradient $\gamma$ with incidence $\alpha$ implicit in control function (2), the values of the constants $a$ and $b$ being taken, as before, as thirteen degrees of 0·6 respectively. The line III (since $\theta = \alpha + \gamma$) is the line:

$$1·6\alpha + 0·6\gamma = 13$$

and this intersects curves IV to VI which respectively represent the variation in climb capability of the aircraft with incidence $\alpha$ under three different performance conditions. Curves IV and VI are those applicable respectively to the high and low extremes of performance conditions, whereas the curve V is that applicable to an intermediate condition under which the weight is high but both engines are operative. The intersection of the line III with each curve IV to VI indicates the climb incidence that results from maintaining function (2) zero under the relevant performance condition.

The above detailed considerations have dealt only with the situation that exists at the initiation of the missed approach and with the steady, climb-out phase. Nonetheless, the indication provided by the indicator 9 directs the pilot through the intervening part of the maneuver to provide the pitching movement that is required to reduce function (2) to zero and achieve the desired flare-up from the approach path into the appropriate climb-out path. The indicator 9, in accordance with function (3), directs the pilot to produce this flare-up with a controlled, and limited, pitch-rate. Thus, throughout the whole missed approach (and right from the instant of its initiation), the indicator 9 directs the pilot to control the aircraft in pitch in a manner appropriate to achieve a satisfactory flight path, and this applies over a wide range of performance conditions of the aircraft. In addition to directing the pilot throughout overshoot, the instrument may be used in a comparable manner to direct the pilot appropriately through at least the flare-up and climb-out phases of take-off.

The indication that is provided by the indicator 9 is preferably made available to the pilot only when during an approach to a landing he initiates the missed approach. To this end, a simple switch may be included between the summing amplifier 7 and the indicator 9 to be operated by the pilot and then supply the signal representative of function (3) to the indicator 9, only when the overshoot is to be made. This switch may be arranged, for example, such that it is operated automatically if there is rapid opening of the engine-throttles during a landing-approach. When a switch is used in the above manner, the director demand is presented as a sudden change in indication of the indicator 9, and if this is found disconcerting, it may be preferable to arrange that the demand is introduced gradually. In this connection, the desired gradual introduction of the demand can be achieved with the system of FIGURE 1 simply by arranging that until the switch is operated to initiate overshoot, the limit imposed upon the demand $(D\theta)_d$ by the limiter 6 is zero degrees per second, and that this limit is increased gradually to its full value following operation of the switch.

Although with the instrument described above with reference to FIGURE 1, the demand based on function (2) is presented as a demand for pitch-rate, this is not essentially so. Instead of comparing the value of function (2) with the pitch-rate of the aircraft and then displaying the difference, the value of function (2) may be displayed directly, the pilot being directed thereby to reduce the indicated value to zero as before, but not in this case at a controlled rate. The second form of aircraft instrument that is to be described with reference to FIGURE 4 is one in which the value of the basic control function (2) is displayed directly and the direction given thereby is introduced gradually upon initiation of the overshoot maneuver.

Referring to FIGURE 4, an incidence sensor 11 supplies to a summing amplifier 12 a signal representative of the angle of incidence $\alpha$ of the aircraft, to be combined therein with two other signals. One of these two other signals, which signal is supplied via a pre-set resistance unit 13 from a pitch attitude gyro 14, is representative of the term $b\theta$, whereas the other signal, which is supplied by a pre-set unit 15, is representative of the constant angle $a$.

The output signal of the summing amplifier 12, being representative of the value of function (2), is supplied directly to a summing amplifier 16 which is connected via a contact-set 17 of a push-button switch 18 to an indicator 19. In addition, the output signal of the summing amplifier 12 is supplied to a change-over contact-set 20 of the switch 18. When the switch 18 is unoperated the contact-set 17 is open, whereas the contact-set 20 passes the output signal of the summing amplifier 12 to appear across a capacitor 21. The signal appearing across the capacitor 21 is applied to the summing amplifier 16 to be subtracted therein from the signal applied directly from the summing amplifier 12. When the switch 18 is operated, the contact-set 17 is closed to pass the output signal of the summing amplifier 16 to the indicator 19, and the contact-set 20 is switched over to break the supply therethrough of the signal from the summing amplifier 12 and connect a resistor 22 across the capacitor 21.

During an approach to a landing and before the initiation of a missed approach, the push-button switch 18 remains unoperated, and in these circumstances the signal representative of the value of function (2) is applied to the summing amplifier 16 both directly and from across the capacitor 21. Accordingly, the output signal from the summing amplifier 16 is maintained at zero until the push-button switch 18 is operated. When the missed approach is initiated the pilot operates switch 18 thereby closing the contact-set 17 and supplying the output signal of the summing amplifier 16 to the indicator 19. Operation of the switch 18 also connects, via the contact-set 20, the resistor 22 across the capacitor 21. Thus, although initially the value of signal supplied to the indicator 19 is zero, this value rises exponentially towards the value of the output signal from the summing amplifier 12, as the capacitor 21 discharges through the resistor 22. The time constant of discharge is, for example, two seconds, and once the capacitor 21 is fully discharged the indicator 19 thereafter indicates the full value of the output signal from the summing amplifier 12, that is to say, the value of function (2). The pilot controls the aircraft in pitch to reduce the indication, and thereby the value of function (2), to zero and accordingly achieve the appropriate climb-out. The indication simply shows the extent to which function (1) differs from the constant $a$, and does not give direction as to the pitch-rate at which this difference is to be reduced to zero.

Like the pre-set unit 5 of FIGURE 1, the pre-set unit 15 may be arranged such that its setting is varied in accordance with the setting of the flaps of the aircraft. In either case, where the setting is varied in this manner, it is preferable that any change in the value of the constant $a$ occasioned by change in setting of the flaps shall be introduced smoothly. Furthermore, if it should be found in any application that the value of the constant $a$ chosen to give a suitable climb condition, does not give rise to a strong enough demand for pitch-up movement at the beginning of the missed approach, then this value may be boosted transiently. In the latter connection, and referring to FIGURE 4 by way of example, the boosting of the value of constant $a$ may be achieved by arranging that a transient signal representing an increment in constant $a$ is supplied to the summing amplifier 12 additively with the signal from the unit 15, the transient signal being generated by unit 23 upon operation of the switch 18 and decreasing to zero exponentially.

Each of the indicators 9 and 19 referred to above may be of the general kind described in U.S. Patent No. 3,191,147 issued June 22, 1965, to A. M. A. Majendie, but may be a normal form of director-horizon instrument or a center zero meter of conventional form. In the former case, each indicator may be specifically as described in U.S. Patent No. 3,085,429 issued Apr. 16, 1963, to A. M. A. Majendie, and include one or more cylindrical members each of which is mounted for rotation about its longitudinal axis and carries an optically distinct helical band coaxial therewith, the cylindrical member in each instance being rotated by a servo system at a rate and in a sense dependent upon the magnitude and sense respectively of the signal received by the indicator, so that the helical band provides an optical effect of movement at a rate and in a sense dependent upon the magnitude and sense of function (3) or function (2) as the case may be. When this form of indicator is used, the pilot controls the aircraft in pitch to achieve the condition in which the cylindrical members do not rotate, and so thereby comply with the relevant director law.

Although in the instrument described above with reference to FIGURE 1, the signal dependent upon pitch rate is derived by the network 8 from the signal representative of pitch angle $\theta$, it may instead be supplied from a pitch rate gyro. Furthermore, although the signals representative respectively of the demanded and actual pitch rates are combined in the amplifier 7 to provide a signal that represents the differences between them, this is not necessarily the case. The instrument may instead include an indicator that is supplied with the two signals separately and which provides indications of both in such a way as to enable the pilot readily to compare the two. Such an indicator may include two movable indices which are arranged to be positioned in accordance with the two signals respectively, so that the required indication is provided by the positions of the two indices relative to one another. The two indices may be movable along parallel paths one in front of the other, and may be arranged to be positioned along said paths in accordance with the two signals such that the front index lies directly in front of the rear index when function (3) is substantially zero. In these circumstances the rear index may have a width, measured in the direction of its path of movement, which is substantially larger than the corresponding width of the front index, the front index being arranged to be positioned in accordance with the signal dependent upon rate of change of pitch attitude, and the rear index being arranged to be positioned in accordance with the signal dependent upon the demanded pitch rate. Similar considerations apply in relation to the display of the difference between function (1) and the value of the constant $a$ in the case of the instrument of FIGURE 4.

We claim:

1. An aircraft instrument comprising first means for supplying a signal dependent upon pitch attitude $\theta$ of the aircraft, second means for supplying a signal dependent upon incidence $\alpha$ of the aircraft, and third means for supplying in accordance with the signals supplied by the first and second means a representation dependent upon any difference of function $(\alpha + b\theta)$ where $b$ is a positive factor, from a predetermined programmed value.

2. An aircraft instrument according to claim 1 including fourth means for providing a signal dependent upon said predetermined value, and a summing amplifier responsive to the signals provided by said first, second and fourth means to provide a signal representative of said difference.

3. An aircraft instrument according to claim 2 wherein said predetermined value is dependent upon the setting of flaps of the aircratf, said fourth means being selectively-variable means set in accordance with the flap setting.

4. An aircraft instrument according to claim 1 including means to boost the said programmed value transiently.

5. An aircraft instrument according to claim 1 including means to supply to said third means an additional signal representative of a basic programmed value of said function, and further means to supply to said third means a further signal representative of an increment in said basic programmed value, said third means being responsive jointly to said additional and further signals to derive said value $a$ as the sum of said basic value and said increment.

6. An aircraft instrument according to claim 5 wherein said further means is operable to supply said further signal that decreases progressively with time.

7. An aircraft instrument comprising first means for supplying a signal in accordance with pitch attitude $\theta$ of the aircraft, second means for supplying a signal in accordance with incidence $\alpha$ of the aircraft, and third means for providing in accordance with the signals supplied by the first and second means a representation in both magnitude and sense of the extent by which the algebraic sum of $\alpha$ and $b\theta$, where $b$ is a positive factor, differs from a predetermined programmed value $a$ of said sum.

8. An aircraft instrument according to claim 7 wherein said third means includes an indicator for providing said representation as a visual representation of said extent of difference.

9. An aircraft instrument according to claim 8 wherein said third means includes a selectively-operable electric switch, means to supply an electric signal in accordance with said extent of difference, and electric circuit means to apply this electric signal to the indicator only when the switch is in its operated state.

10. An aircraft instrument according to claim 9 wherein said electric circuit means includes means responsive to operation of said switch to introduce said electric signal to the indicator gradually.

11. An aircraft instrument comprising first means for providing a signal in accordance with pitch attitude of the aircraft, second means for providing a signal in accordance with incidence of the aircraft, third means for providing a signal in accordance with rate of change of pitch attitude of the aircraft, and fourth means responsive to the signals provided by the first, second and third means to provide a representation of difference between said rate of change of pitch attitude and a demanded rate of change of pitch attitude, said demanded rate of change of pitch attitude having a value which is in accordance with the extent by which a function that is dependent upon both said pitch attitude and the incidence of the aircraft differs from a predetermined programmed value.

12. An aircraft instrument according to claim 11 including an indicator for providing a visual representation in magnitude and sense of the difference between the demanded and actual rates of change of pitch attitude.

13. An aircraft instrument comprising first means for providing a signal representative of pitch angle $\theta$ of the aircraft, second means for providing a signal representative of incidence angle $\alpha$ of the aircraft, and third means for providing in accordance with the two signals a visual representation of the value in magnitude and sense of the function:

$$a - (\alpha + b\theta)$$

where $a$ and $b$ are both predetermined constants.

14. An aircraft instrument according to claim 13 wherein said first means is a gyro unit.

15. An aircraft instrument comprising means for supplying a first signal in accordance with pitch attitude of the aircraft, means for supplying a second signal in accordance with incidence of the aircraft, means for providing in accordance with said first and second signals a third signal representative of a demanded rate of change of pitch attitude, said third signal being dependent in both magnitude and sense upon the extent by which the algebraic sum of two terms that are dependent respectively upon said pitch attitude and incidence, differs from a predetermined programmed value of said sum, means for supplying a fourth signal in accordance with actual rate of change of pitch attitude of the aircraft, and fifth means for providing in accordance with said third and fourth signals a representation of the difference between the demanded and actual rates of change of pitch attitude.

16. An aircraft instrument comprising first means for supplying a signal in accordance with pitch attitude of the aircraft, second means for supplying a signal in accordance with incidence of the aircraft, and third means for providing in accordance with the signals supplied by said first and second means a visual representation of the extent, in both magnitude and sense, by which the algebraic sum of two terms that are dependent respectively upon pitch attitude and incidence, differs from a predetermined programmed value, and wherein said third means comprises a selectively-operable electric switch, means responsive to the signals supplied by said first and second means to supply an electric signal in accordance with said extent of any difference between sum and said predetermined value, an indicator that is responsive to the application thereto of said electric signal to provide said visual representations, and electric circuit means to apply said electric signal to said indicator only when said switch is in its operated state, said electric circuit means being responsive to operation of said switch to introduce said electric signal to the indicator gradually and including a capactiance, means for supplying said electric signal to charge the capacitance while said switch is unoperated, a resistance, means responsive to operation of said switch to connect said resistance across the capacitance so as thereby to discharge the capacitance, and means for subtracting from the signal applied to the indicator when the switch is in its operated state the signal appearing across the capacitance.

17. An aircraft instrument according to claim 15 including a limiter for limiting the demanded rate of change of pitch attitude to a predetermined maximum value.

18. An aircraft instrument according to claim 15 including an indicator for providing a visual representation of said difference between the demanded and actual rates of changes of pitch attitude.

References Cited
UNITED STATES PATENTS

| | | | |
|---|---|---|---|
| 3,043,540 | 7/1962 | Greene | 73—178 |
| 3,200,642 | 8/1965 | Neuendorf et al. | 73—178 |
| 3,295,369 | 1/1967 | Priestley | 73—178 |

LOUIS R. PRINCE, *Primary Examiner.*

DAVID SCHONBERG, *Examiner.*

N. B. SIEGEL, *Assistant Examiner.*